United States Patent
Lee et al.

(10) Patent No.: US 10,993,202 B2
(45) Date of Patent: *Apr. 27, 2021

(54) METHOD FOR RECEIVING OR TRANSMITTING REFERENCE SIGNAL FOR LOCATION DETERMINATION IN WIRELESS COMMUNICATION SYSTEM AND DEVICE FOR SAME

(71) Applicant: LG ELECTRONICS INC., Seoul (KR)

(72) Inventors: Hyunho Lee, Seoul (KR); Hanjun Park, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,320

(22) Filed: May 14, 2020

(65) Prior Publication Data

US 2020/0275403 A1 Aug. 27, 2020

Related U.S. Application Data

(63) Continuation of application No. 16/530,228, filed on Aug. 2, 2019, now Pat. No. 10,681,670, which is a
(Continued)

(51) Int. Cl.
*H04W 64/00* (2009.01)
*G01S 5/10* (2006.01)
(Continued)

(52) U.S. Cl.
CPC ............. *H04W 64/003* (2013.01); *G01S 1/20* (2013.01); *G01S 5/0036* (2013.01);
(Continued)

(58) Field of Classification Search
CPC .. G01S 5/02; G01S 5/10; H04B 7/068; H04B 7/0684; H04W 64/00
See application file for complete search history.

(56) References Cited

U.S. PATENT DOCUMENTS

2012/0015667 A1* 1/2012 Woo .................... H04W 64/006
455/456.1
2012/0231809 A1 9/2012 Siomina et al.
(Continued)

FOREIGN PATENT DOCUMENTS

CN 102388660 A 3/2012
CN 104010363 A 8/2014
(Continued)

OTHER PUBLICATIONS

Intel Corporation, "Discussion on Potential Enhancement of Positioning Techniques", 3GPP TSG-RAN WGI #80bis, R1-151445, Belgrade, Serbia, Apr. 20-24, 2015, pp. 1-5.

*Primary Examiner* — Liton Miah
(74) *Attorney, Agent, or Firm* — Birch, Stewart, Kolasch & Birch, LLP

(57) ABSTRACT

A method of reporting information for positioning by a user equipment (UE) in a wireless communication system, includes receiving, from a location server, assistant data related to plurality of cells including a reference cell and one or more neighbor cells; receiving, from the location server, quasi-co-location (QCL) information on the PRS of the plurality of cells and the CRS of the plurality of cells; calculating a reference signal time difference (RSTD) measurement value using a positioning reference signal (PRS) of the plurality of cells and a cell-specific reference signal (CRS) of the plurality of cells based on the assistant data; and reporting the RSTD measurement value to the location server, wherein the assistant data includes information on a cyclic prefix (CP) length of the PRS of the plurality of cells,
(Continued)

a CP length of the CRS of the plurality of cells, and a multicast broadcast single frequency network (MBSFN) subframe configuration of the plurality of cells.

8 Claims, 7 Drawing Sheets

Related U.S. Application Data continuation of application No. 15/744,548, filed as application No. PCT/KR2016/008753 on Aug. 9, 2016, now Pat. No. 10,405,293.

(60) Provisional application No. 62/222,218, filed on Sep. 23, 2015, provisional application No. 62/209,354, filed on Aug. 25, 2015.

(51) Int. Cl.
| | |
|---|---|
| *G01S 5/00* | (2006.01) |
| *G01S 1/20* | (2006.01) |
| *H04W 72/04* | (2009.01) |
| *H04W 8/26* | (2009.01) |
| *H04W 24/10* | (2009.01) |
| *G01S 5/02* | (2010.01) |
| *H04J 11/00* | (2006.01) |
| *H04L 5/00* | (2006.01) |

(52) U.S. Cl.
CPC ............. *G01S 5/0236* (2013.01); *G01S 5/10* (2013.01); *H04J 11/00* (2013.01); *H04L 5/0048* (2013.01); *H04L 5/0055* (2013.01); *H04W 8/26* (2013.01); *H04W 24/10* (2013.01); *H04W 64/00* (2013.01); *H04W 72/0406* (2013.01)

(56) References Cited

U.S. PATENT DOCUMENTS

| | | | |
|---|---|---|---|
| 2012/0307670 A1* | 12/2012 | Kazmi | ................. H04W 24/10 370/252 |
| 2013/0040673 A1* | 2/2013 | Siomina | ................ G01S 5/0226 455/501 |
| 2013/0315168 A1* | 11/2013 | Frank | .................... G01S 5/0205 370/329 |
| 2014/0148198 A1 | 5/2014 | Siomina et al. | |
| 2014/0176366 A1* | 6/2014 | Fischer | ............... H04W 64/006 342/374 |
| 2014/0295883 A1 | 10/2014 | Kang et al. | |
| 2014/0349677 A1 | 11/2014 | Xiao et al. | |
| 2015/0018010 A1 | 1/2015 | Fischer | |
| 2015/0131749 A1 | 5/2015 | Slomina et al. | |
| 2015/0296359 A1 | 10/2015 | Edge | |
| 2015/0358848 A1 | 12/2015 | Kim et al. | |
| 2016/0065342 A1* | 3/2016 | Mirbagheri | ........... H04L 5/0007 370/330 |
| 2016/0223639 A1 | 8/2016 | Davydov et al. | |
| 2018/0011163 A1 | 1/2018 | Han et al. | |

FOREIGN PATENT DOCUMENTS

| | | |
|---|---|---|
| EP | 3291583 A1 | 3/2018 |
| JP | 2011-49906 A | 3/2011 |
| JP | 2013-502179 A | 1/2013 |
| JP | 2014-503799 A | 2/2014 |
| JP | 2014-511477 A | 5/2014 |
| JP | 2015-508956 A | 3/2015 |
| JP | 2016-509771 A | 3/2016 |
| KR | 10-2011-0050576 A | 5/2011 |
| KR | 10-2014-0089249 A | 7/2014 |
| KR | 10-1527041 B1 | 6/2015 |
| WO | WO 2013/036060 A1 | 3/2013 |
| WO | WO 2016/122812 A1 | 8/2016 |

* cited by examiner

METHOD FOR RECEIVING OR TRANSMITTING REFERENCE SIGNAL FOR LOCATION DETERMINATION IN WIRELESS COMMUNICATION SYSTEM AND DEVICE FOR SAME

CROSS-REFERENCE TO RELATED APPLICATIONS

This Application is a Continuation of U.S. patent application Ser. No. 16/530,228 filed on Aug. 2, 2019 (now U.S. Pat. No. 10,681,670 issued on Jun. 9, 2020), which is a Continuation of U.S. patent application Ser. No. 15/744,548 filed on Jan. 12, 2018 (now US. Pat. No. 10,405,293 issued on Sep. 3, 2019), which is the National Phase of PCT International Application No. PCT/KR2016/008753 filed on Aug. 9, 2016, which claims the priority benefit under 35 U.S.C. § 119(e) to U.S. Provisional Application Nos. 62/222,218 filed on Sep. 23, 2015 and 62/209,354 filed on Aug. 25, 2015, all of these applications are hereby expressly incorporated by reference into the present application.

BACKGROUND OF THE INVENTION

Field of the Invention

The present invention relates to a wireless communication system, and more particularly, to a method of measuring a reference signal for determining a location or a method of determining a location in a wireless communication system and an apparatus therefor.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

A technical task of the present invention is to propose a method of determining a location based on a reference signal.

Technical tasks obtainable from the present invention are non-limited the above-mentioned technical task. And, other unmentioned technical tasks can be clearly understood from the following description by those having ordinary skill in the technical field to which the present invention pertains.

To achieve these and other advantages and in accordance with the purpose of the present invention, as embodied and broadly described, according to one embodiment, a method of measuring a reference signal for positioning in a wireless communication system, the method performed by a terminal and includes receiving assistant data related to a reference cell and one or more neighbor cells for positioning, calculating a reference signal time difference (RSTD) measurement value by receiving a positioning reference signal (PRS) or a cell-specific reference signal (CRS) of the reference cell and the one or more neighbor cells using the assistant data, and reporting the measurement value to a location server. In this case, the assistant data may include information on the number of CRS antenna ports, CRS cyclic prefix (CP) length information, and configuration information on multicast broadcast single frequency network (MBSFN) subframes of the reference cell and the one or more neighbor cells.

Additionally or alternatively, the information on the number of CRS antenna ports can indicate one selected from the group consisting of 1, 2, and 4.

Additionally or alternatively, the CRS CP length information may exist only when a CP length of a PRS of the reference cell is different from a CP length of a CRS of the reference cell or a CP length of a PRS of the one or more neighbor cells is different from a CP length of a CRS of the one or more neighbor cells.

Additionally or alternatively, if the CRS CP length information is not included in the assistant data, the CP length of the PRS of the reference cell may be identical to the CP length of the CRS of the reference cell or the CP length of the PRS of the one or more neighbor cells may be identical to the CP length of the CRS of the one or more neighbor cells.

Additionally or alternatively, the configuration information on the MBSFN subframes may be provided in a unit of 1 or 4 radio frames.

Additionally or alternatively, when the assistant data related to a specific cell of the one or more neighbor cells does not include all or a part of the information on the number of CRS antenna ports, the CRS CP length information, and the configuration information on the MBSFN subframes, a CRS may not be used for measuring the RSTD measurement for the specific cell.

Additionally or alternatively, when the assistant data related to a specific cell of the one or more neighbor cells does not include all or a part of the information on the number of CRS antenna ports, the CRS CP length information, and the configuration information on the MBSFN subframes, the method may further include calculating the RSTD measurement value by receiving a CRS only transmitted via a CRS port 0 of the specific cell.

Additionally or alternatively, if the assistant data related to a specific cell of the one or more neighbor cells does not include all or a part of the information on the number of CRS antenna ports, the CRS CP length information, and the configuration information on the MBSFN subframes, the method may further include calculating the RSTD measurement value by receiving a CRS on a specific OFDM symbol only, which transmitted from the specific cell.

Additionally or alternatively, if the assistant data related to a specific cell of the one or more neighbor cells does not include all or a part of the information on the number of CRS antenna ports, the CRS CP length information, and the configuration information on the MBSFN subframes, the method may further include calculating the RSTD measurement value by receiving a PRS only, which transmitted from the specific cell.

Additionally or alternatively, if a physical layer cell identifier (ID) field of the reference cell is identical to a physical cell ID of at least one neighbor cell among the one or more neighbor cells, only a PRS of the reference cell may be used for measuring RSTD and RSTD measurement may not be performed for the at least one neighbor cell.

Additionally or alternatively, if a physical layer cell identifier (ID) field of the reference cell is identical to a physical cell ID of at least one neighbor cell among the one or more neighbor cells, only a PRS of the reference cell may be used for measuring RSTD and only a PRS of the at least one neighbor cell may be used for measuring RSTD.

Additionally or alternatively, if a physical layer cell identifier (ID) field of the reference cell is identical to a physical cell ID of at least one neighbor cell among the one or more neighbor cells, a PRS and/or a CRS of the reference cell may be used for measuring RSTD and RSTD measurement may not be performed on the at least one neighbor cell.

Additionally or alternatively, if a physical layer cell identifier (ID) field of the reference cell is identical to a physical cell ID of at least one neighbor cell among the one or more neighbor cells, a PRS and/or a CRS of the reference cell may be used for measuring RSTD and only a PRS of the at least one neighbor cell may be used for measuring RSTD.

Additionally or alternatively, if physical layer cell identifiers (IDs) of a plurality of neighbor cells included in the assistant data are identical to each other, only a PRS of a predetermined neighbor cell among the plurality of the neighbor cells is used for measuring RSTD and RSTD measurement may not be performed on the remaining neighbor cells other than the predetermined neighbor cell.

Additionally or alternatively, if physical layer cell identifiers (IDs) of a plurality of neighbor cells included in the assistant data are identical to each other, only a PRS of a predetermined neighbor cell among the plurality of the neighbor cells is used for measuring RSTD and only PRS of the remaining neighbor cells other than the predetermined neighbor cell may be used for measuring RSTD.

Additionally or alternatively, if physical layer cell identifiers (IDs) of a plurality of neighbor cells included in the assistant data are identical to each other, a PRS and/or a CRS of a predetermined neighbor cell among a plurality of the neighbor cells is used for measuring RSTD and RSTD measurement may not be performed on the remaining neighbor cells.

Additionally or alternatively, if physical layer cell identifiers (IDs) of a plurality of neighbor cells included in the assistant data are identical to each other, a PRS and/or a CRS of a predetermined neighbor cell among the plurality of the neighbor cells may be used for measuring RSTD and only PRSs of the remaining neighbor cells other than the predetermined neighbor cell may be used for measuring RSTD.

Additionally or alternatively, the method may further include receiving information on a specific reference signal (RS), which is in a quasi-co-location (QCL) relation with the PRS of the reference cell or the one or more neighbor cells. In this case, the information on the specific RS may be used for determining a channel property of the PRS, which is in the QCL relation with the RS.

Additionally or alternatively, the information on the specific RS may include information on a specific antenna port of the RS, which is in the QCL relation with the PRS.

To further achieve these and other advantages and in accordance with the purpose of the present invention, according to a different embodiment, a user equipment configured to measure a reference signal for positioning in a wireless communication system includes a transmitter, a receiver, and a processor that controls the transmitter and the receiver, wherein the processor controls the receiver to receive assistant data related to a reference cell and one or more neighbor cells for positioning, calculates an reference signal time difference (RSTD) measurement value by receiving a positioning reference signal (PRS) or a cell-specific reference signal (CRS) of the reference cell and the one or more neighbor cells using the assistant data, and reports the measurement value to a location server. In this case, the assistant data may include information on the number of CRS antenna ports, CRS cyclic prefix (CP) length information, and configuration information on multicast broadcast single frequency network (MBSFN) subframes of the reference cell and the one or more neighbor cells.

Technical solutions obtainable from the present invention are non-limited the above-mentioned technical solutions. And, other unmentioned technical solutions can be clearly understood from the following description by those having ordinary skill in the technical field to which the present invention pertains.

According to one embodiment of the present invention, it is able to efficiently receive or transmit a reference signal for determining a location and measure the reference signal in a wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

Figure 1:
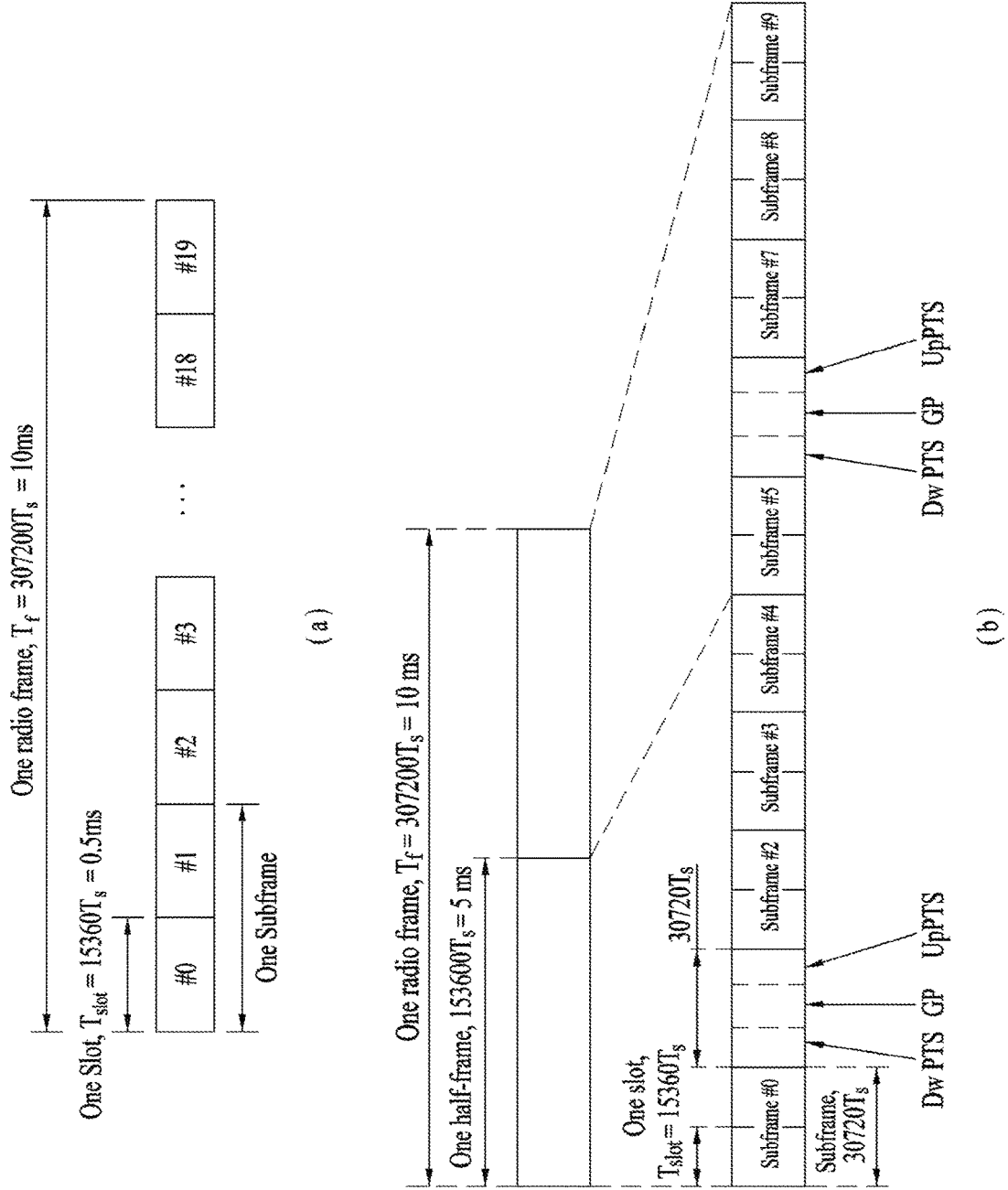
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1($a$) illustrates a frame structure for frequency division duplex (FDD) used in 3GPP LTE/LTE-A and FIG. 1($b$) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
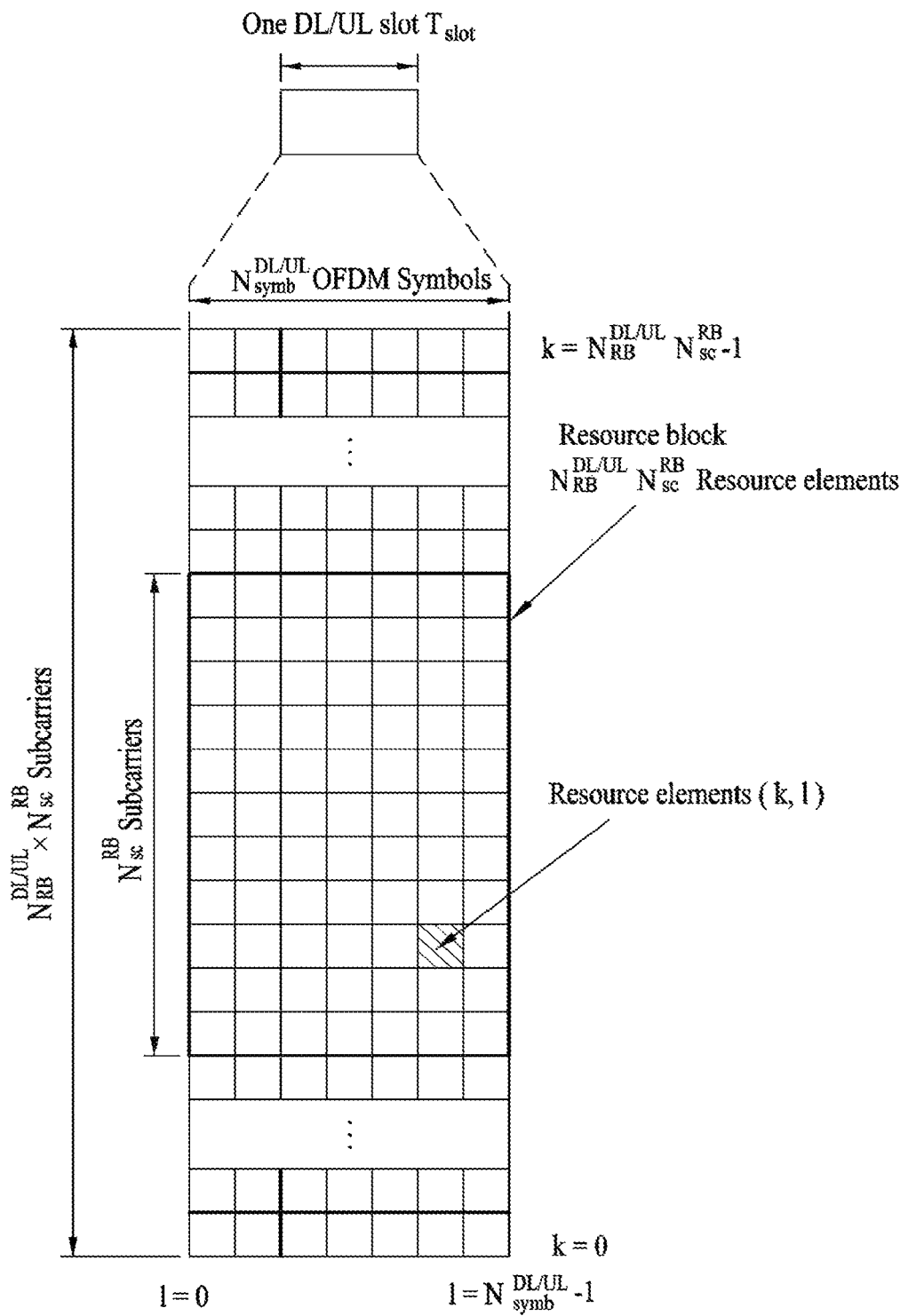
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs.

Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
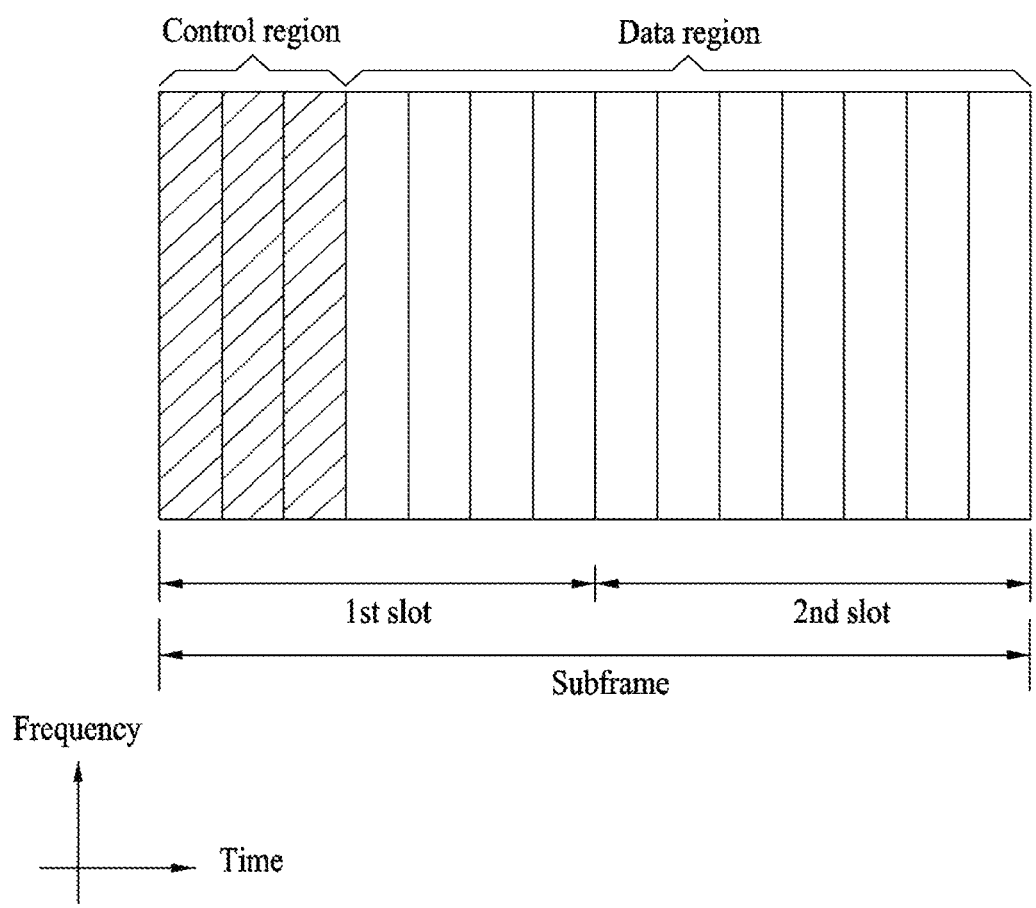
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
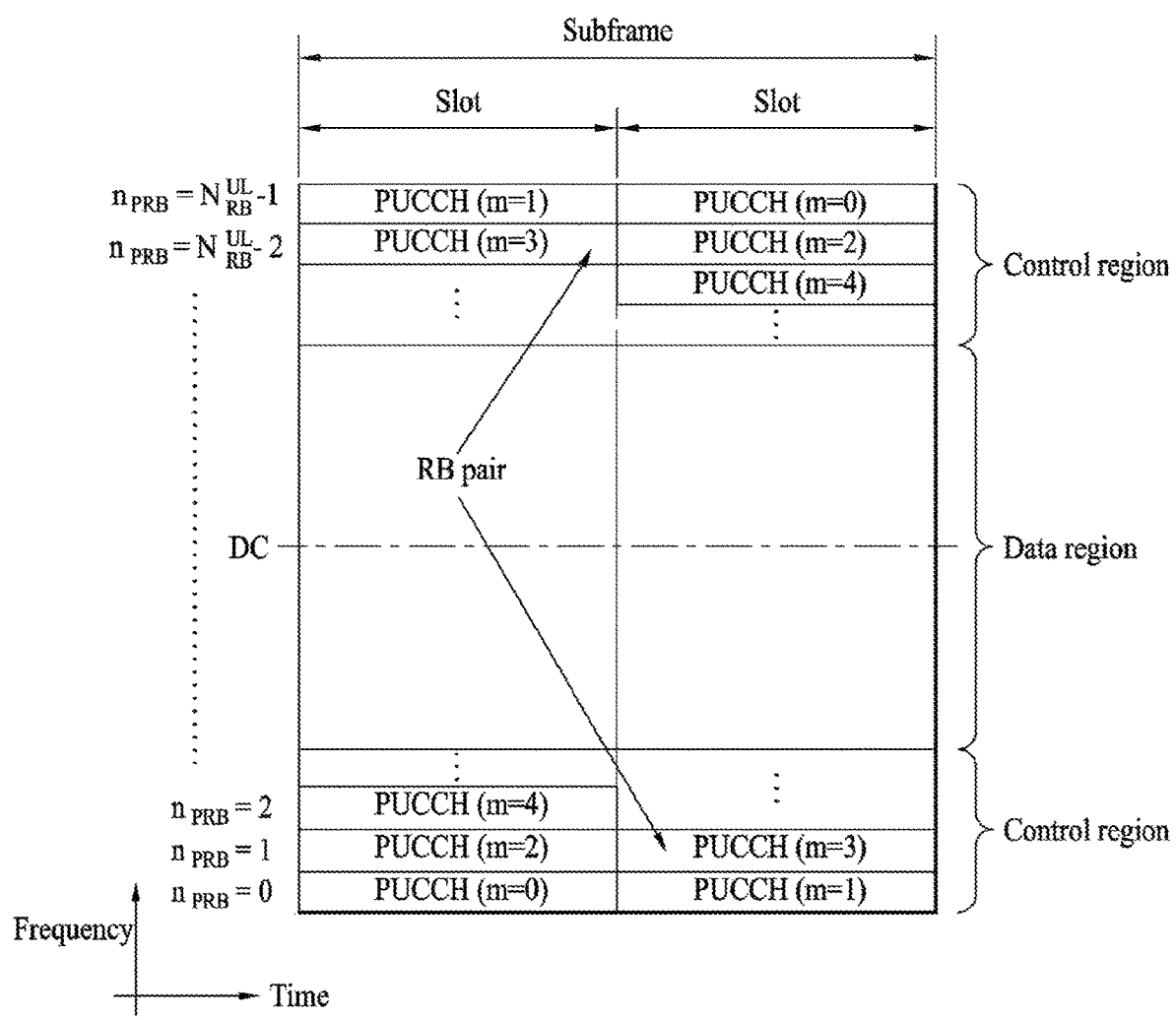
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMFRI and PUCCH format 3 is used to transmit ACK/NACK information.

In general, in order for a network obtain location information of a UE in a cellular communication system, various methods are used. In LTE system, a UE receives PRS (positioning reference signal) transmission related information from a higher layer signal and measures PRSs transmitted by cells near the UE to deliver an RSTD (reference signal time difference) corresponding to a difference between reception timing of a PRS transmitted by a reference eNB and reception timing of a PRS transmitted by a neighboring eNB to an eNB or a network. The network calculates a location of the UE by utilizing the RSTD and other information. The abovementioned positioning scheme utilizes OTDOA (observed time difference of arrival). Besides, other schemes such as A-GNSS (Assisted Global Navigation Satellite System) positioning scheme, E-CID (Enhanced Cell-ID) scheme, UTDOA (Uplink Time Difference of Arrival), and the like exist. The positioning schemes can be utilized for various location-based services (e.g., advertisement, location tracking, emergency communication means, etc.).

[LTE Positioning Protocol]

In LTE system, an LPP (LTE positioning protocol) has been defined to support the OTDOA scheme and the LPP informs a UE of OTDOA-ProvideAssistanceData including configuration described in the following as an IE (information element).

```
    -- ASN1START
    OTDOA-ProvideAssistanceData         ::= SEQUENCE {
    otdoa-ReferenceCellInfo  OTDOA-ReferenceCellInfo  OPTIONAL,-- Need ON
    otdoa-NeighbourCellInfo         OTDOA-NeighbourCellInfoList
        OPTIONAL,-- Need ON
    otdoa-Error OTDOA-Error OPTIONAL, -- Need ON
    ...
    }
    -- ASN1STOP
```

In this case, the OTDOA-ReferenceCellInfo corresponds to a cell becoming a reference for measuring RSTD. The OTDOA-ReferenceCellInfo is configured asfollows.

```
    -- ASN1START
    OTDOA-ReferenceCellInfo ::= SEQUENCE {
    physCellId INTEGER (0..503),
    cellGlobalId ECGI OPTIONAL,          -- Need ON
    earfcnRef ARFCN-ValueEUTRA              OPTIONAL, --    Cond NotSameAsServ0
    antennaPortConfig ENUMERATED {ports1-or-2, ports4, ...} OPTIONAL, -- Cond NotSameAsServ1
    cpLength ENUMERATED { normal, extended, ... },
    prsInfo PRS-Info OPTIONAL,           -- Cond PRS
    ...,
    [[ earfcnRef-v9a0 ARFCN-ValueEUTRA-v9a0 OPTIONAL --    Cond NotSameAsServ2
    ]]
    }
    -- ASN1STOP
```

In this case, conditional presence is shown in the following.

TABLE 5

| Conditional presence | Description |
| --- | --- |
| NotSameAsServ0 | This field is absent if earfcnRef-v9a0 is present. Otherwise, the field is mandatory present if the EARFCN of the OTDOA assistance data reference cell is not the same as the EARFCN of the target devices's current primary cell. |
| NotSameAsServ1 | The field is mandatory present if the antenna port configuration of the OTDOA assistance data reference cell is not the same as the antenna port configuration of the target devices's current primary cell. |
| NotSameAsServ2 | The field is absent if earfcnRef is present. Otherwise, the field is mandatory present if the EARFCN of the OTDOA assistance data reference cell is not the same as the EARFCN of the target devices's current primary cell. |
| PRS | The field is mandatory present if positioning reference signals are available in the assistance data reference cell; otherwise it is not present. |

Each field of the OTDOA-ReferenceCellInfo is described in the following.

TABLE 6

| Description on OTDOA-ReferenceCellInfo fields |
| --- |
| physCellId<br>This field specifies the physical cell identity of the assistance data reference cell.<br>cellGlobalId<br>This field specifies the ECGI, the globally unique identity of a cell in E-UTRA, of the assistance data reference cell. The server should include this field if it considers that it is needed to resolve ambiguity in the cell indicated by physCellId.<br>earfcnRef<br>This field specifies the EARFCN of the assistance data reference cell.<br>antennaPortConfig<br>This field specifies whether 1 (or 2) antenna port(s) or 4 antenna ports for cell specific reference signals (CRS) are used in the assistance data reference cell.<br>cpLength<br>This field specifies the cyclic prefix length of the assistance data reference cell PRS if the prsInfo field is present, otherwise this field specifies the cyclic prefix length of the assistance data reference cell CRS.<br>prsInfo<br>This field specifies the PRS configuration of the assistance data reference cell. |

Meanwhile, the OTDOA-NeighbourCellInfo corresponds to cells (e.g., eNB or TP) becoming a target of RSTD measurement. The OTDOA-NeighbourCellInfo can include information on maximum 24 neighbor cells according to a frequency layer for maximum 3 frequency layers. In particular, the OTDOA-NeighbourCellInfo can inform a UE of information on 3*24=72 cells in total.

```
-- ASN1START
    OTDOA-NeighbourCellInfoList ::= SEQUENCE (SIZE (1..maxFreqLayers))
OF OTDOA-NeighbourFreqInfo
    OTDOA-NeighbourFreqInfo ::= SEQUENCE (SIZE (1..24)) OF OTDOA-
NeighbourCellInfoElement
    OTDOA-NeighbourCellInfoElement ::= SEQUENCE {
    physCellId INTEGER (0..503),
    cellGlobalId ECGI                       OPTIONAL,          -- Need ON
    earfcn ARFCN-ValueEUTRA                 OPTIONAL,          -- Cond NotSameAsRef0
    cpLength ENUMERATED {normal, extended, ...}
OPTIONAL,                                                      -- Cond NotSameAsRef1
    prsInfo PRS-Info OPTIONAL,     -- Cond NotSameAsRef2
    antennaPortConfig ENUMERATED {ports-1-or-2, ports-4, ...}
OPTIONAL,                                    -- Cond NotsameAsRef3
    slotNumberOffset INTEGER (0..19)                           OPTIONAL,-- Cond NotSameAsRef4
    prs-SubframeOffset INTEGER (0..1279)                       OPTIONAL, -- Cond InterFreq
    expectedRSTD              INTEGER (0..16383),
    expectedRSTD-Uncertainty INTEGER (0..1023),
    ...,
    [[ earfcn-v9a0                 ARFCN-ValueEUTRA-v9a0       OPTIONAL -- Cond
NotSameAsRef5
    ]]
    }
    maxFreqLayers               INTEGER ::= 3
-- ASN1STOP
```

In this case, conditional presence is shown in the following.

TABLE 7

| Conditional presence | Description |
| --- | --- |
| NotSameAsRef0 | The field is absent if earfcn-v9a0 is present. If earfcn-v9a0 is not present, the field is mandatory present if the EARFCN is not the same as for the assistance data reference cell; otherwise it is not present. |
| NotSameAsRef1 | The field is mandatory present if the cyclic prefix length is not the same as for the assistance data reference cell; otherwise it is not present. |
| NotSameAsRef2 | The field is mandatory present if the PRS configuration is not the same as for the assistance data reference cell; otherwise it is not present. |
| NotSameAsRef3 | The field is mandatory present if the antenna port configuration is not the same as for the assistance data reference cell; otherwise it is not present. |
| NotSameAsRef4 | The field is mandatory present if the slot timing is not the same as for the assistance data reference cell; otherwise it is not present. |
| NotSameAsRef5 | The field is absent if earfcn is present. If earfcn is not present, the field is mandatory present if the EARFCN is not the same as for the assistance data reference cell; otherwise it is not present. |
| InterFreq | The field is optionally present, need OP, if the EARFCN is not the same as for the assistance data reference cell; otherwise it is not present. |

Each field of the OTDOA-NeighbourCellInfoList is described in the following.

TABLE 8

| Description on OTDOA-NeighbourCellInfoList fields |
| --- |
| physCellId |
| This field specifies the physical cell identity of the assistance data reference cell. |
| cellGlobalId |
| This field specifies the ECGI, the globally unique identity of a cell in E-UTRA, of the assistance data reference cell. The server should include this field if it considers that it is needed to resolve |

TABLE 8-continued

Description on OTDOA-NeighbourCellInfoList fields ambiguity in the cell indicated by physCellId.
earfcnRef
This field specifies the EARFCN of the assistance data reference cell.
antennaPortConfig
This field specifies whether 1 (or 2) antenna port(s) or 4 antenna ports for cell specific reference
signals (CRS) are used in the assistance data reference cell.
cpLength
This field specifies the cyclic prefix length of the neighbour cell PRS if PRS are present in this
neighbour cell, otherwise this field specifies the cyclic prefix length of CRS in this neighbour cell.
prsInfo
This field specifies the PRS configuration of the neighbour cell.
When the EARFCN of the neighbour cell is the same as for the assistance data reference cell, the
target device may assume that each PRS positioning occasion in the neighbour cell at least partially
overlaps with a PRS positioning occasion in the assistance data reference cell where the maximum
offset between the transmitted PRS positioning occasions may be assumed to not exceed half a subframe.
When the EARFCN of the neighbour cell is the same as for the assistance data reference cell, the
target device may assume that this cell has the same PRS periodicity (Tprs) as the assistance data
reference cell.

In this case, PRS-Info corresponding to IE included in the OTDOA-ReferenceCellInfo and the OTDOA-NeighbourCellInfo includes PRS information. Specifically, the PRS-Info including PRS Bandwidth, PRS Configuration Index (IPRS), Number of Consecutive Downlink Subframes, and PRS Muting Information is configured as follows.

```
PRS-Info ::= SEQUENCE {
prs-Bandwidth ENUMERATED { n6, n15, n25, n50, n75, n100, ... },
prs-ConfigurationIndex INTEGER (0..4095),
numDL-Frames ENUMERATED {sf-1, sf-2, sf-4, sf-6, ...},
...,
prs-MutingInfo-r9 CHOICE {
po2-r9 BIT STRING (SIZE(2)),
po4-r9 BIT STRING (SIZE(4)),
po8-r9 BIT STRING (SIZE(8)),
po16-r9 BIT STRING (SIZE(16)),
...
} OPTIONAL -- Need OP
}
-- ASN1STOP
```

Figure 5:
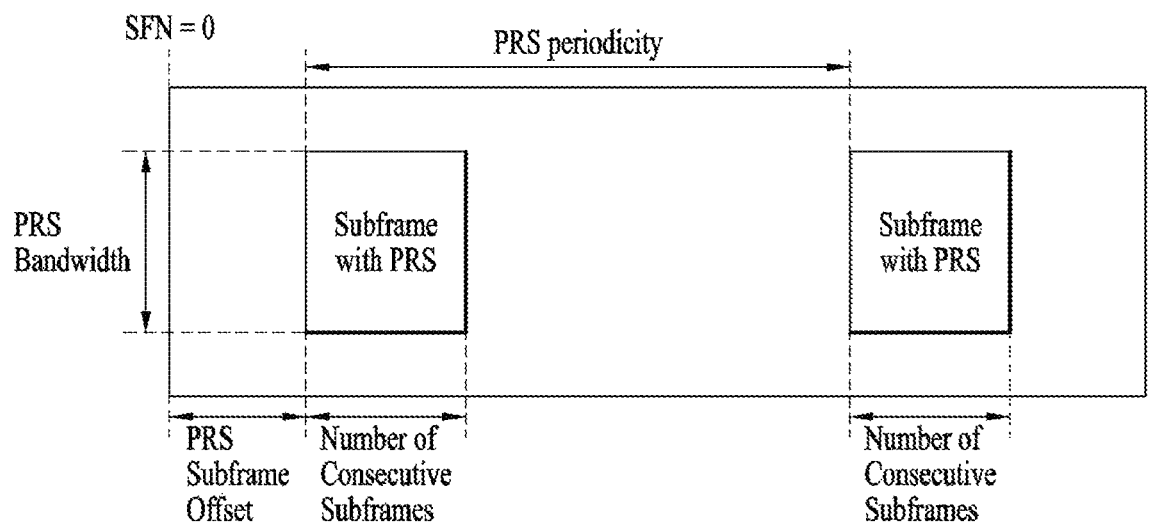
FIG. 5 is a diagram for a PRS transmission structure.

FIG. 5 is a diagram for a PRS transmission structure according to the aforementioned parameters.

In this case, PRS Periodicity and PRS Subframe Offset are determined according to a value of PRS Configuration Index (IPRS) and a corresponding relation is shown in the following table.

TABLE 9

| PRS Configuration Index ($I_{PRS}$) | PRS Periodicity (subframes) | PRS Subframe Offset (subframes) |
|---|---|---|
| 0-159 | 160 | $I_{PRS}$ |
| 160-479 | 320 | $I_{PRS}$ – 160 |
| 480-1119 | 640 | $I_{PRS}$ – 480 |
| 1120-23399 | 1280 | $I_{PRS}$ – 1120 |

[PRS (Positioning Reference Signal)]

Figure 6:
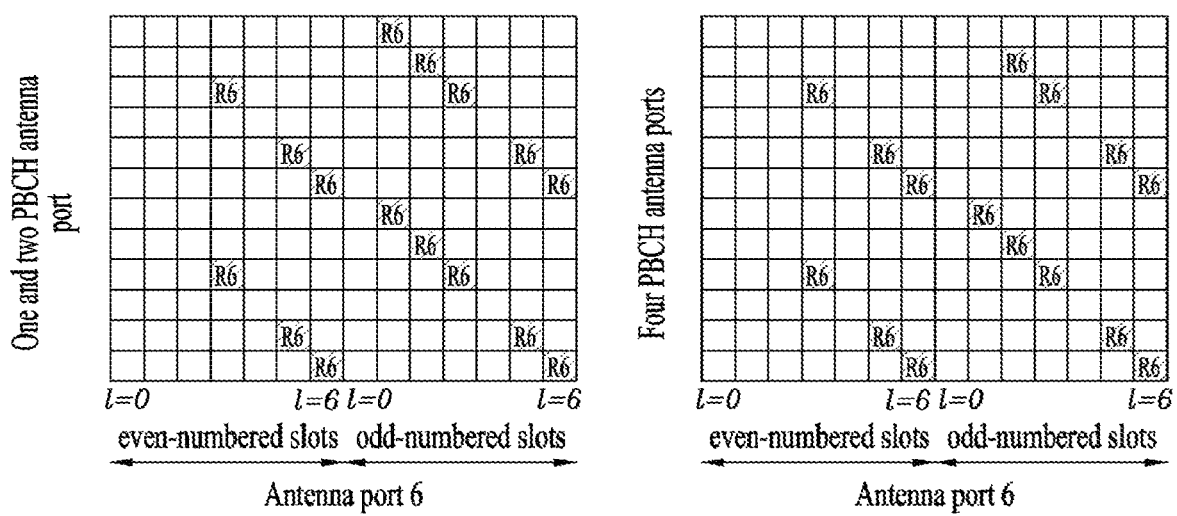
FIGS. 6 and 7 are diagrams for RE mapping of a PRS (positioning reference signal)
Figure 7:
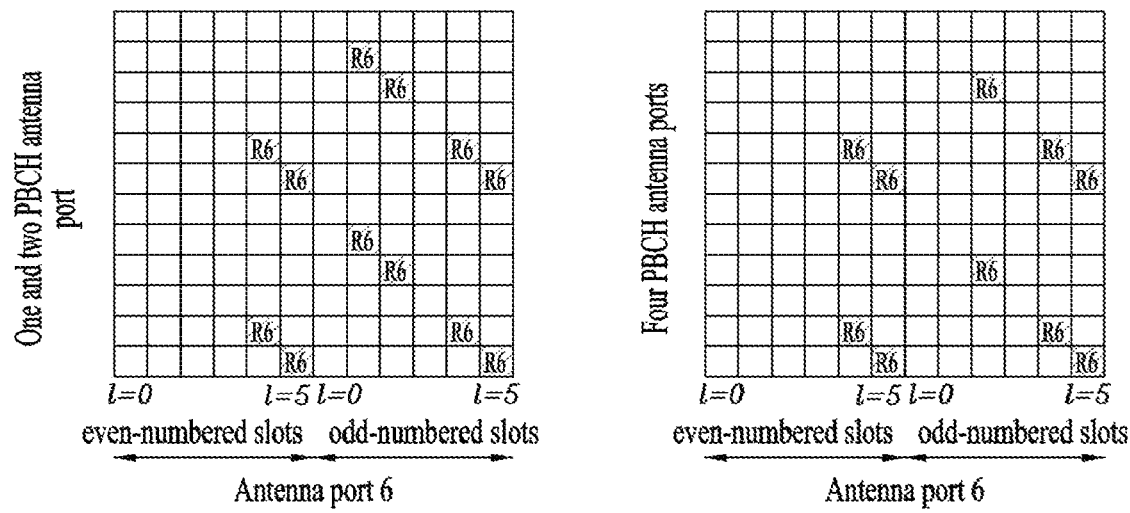

A PRS has a transmission occasion (i.e., a positioning occasion) with a period of 160, 320, 640, or 1280 ms and can be transmitted during N number of continuous DL subframes at a positioning occasion. In this case, the N may have such a value as 1, 2, 4, or 6. Although it is able to practically transmit a PRS at a positioning occasion, the PRS can be muted at the positioning occasion for inter-cell interference control coordination. Information on the PRS muting is signaled to a UE using prs-MutingInfo. Unlike a system bandwidth of a serving eNB, a transmission bandwidth of a PRS can be independently configured. A PRS is transmitted on a frequency band of 6, 15, 25, 50, 75, or 100 RBs (resource blocks). A transmission sequence of a PRS is generated by initializing a pseudo-random sequence generator in every OFDM symbol using functions of a slot index, an OFDM symbol index, a CP (cyclic prefix) type, and a cell ID. As shown in FIG. 6 (normal CP) and FIG. 7 (extended CP), the generated transmission sequences of the PRS are mapped to a resource element (RE) depending on a CP type (normal CP and extended CP). A position of an RE to which a transmission sequence is mapped may shift on a frequency axis and a shift value is determined by a cell ID. FIGS. 6 and 7 show positions of PRS transmission REs where frequency shift corresponds to 0.

A UE receives configuration information on a list of PRSs to be searched from a management server of a network to measure a PRS. The configuration information includes PRS configuration information of a reference cell and PRS configuration information of neighbor cells. Each of the PRS configuration informations includes an occurrence interval of a position occasion and offset, the number of continuous DL subframes constructing a single positioning occasion, a cell ID used for generating a PRS sequence, a CP type, the number of CRS antenna ports considered for mapping a PRS, and the like. In addition, the PRS configuration information of the neighbor cells includes a slot offset and a subframe offset between a neighbor cell and a reference cell, expected RSTD, and a level of uncertainty of the expected RSTD to support a UE to determine a time window for detecting a PRS transmitted by a neighbor cell.

Meanwhile, the RSTD corresponds to a relative timing difference between an adjacent or neighbor cell j and a reference cell i. In particular, the RSTD can be represented as $T_{subframeRxj} - T_{subframeRxi}$. In this case, the $T_{subframeRxj}$ corresponds to the timing at which a UE receives the start of a specific subframe from the adjacent cell j and the $T_{subframeRxi}$ corresponds to the timing at which the UE receives the start of a subframe corresponding to the specific subframe from the reference cell i, which is closest to the specific subframe received from the adjacent cell j in time. A reference point for an examined subframe time difference corresponds to an antenna connector of the UE.

CRS-Related Signaling for RSTD Measurement

OTDOA positioning corresponds to a scheme of estimating a location of a UE estimated by a network, which has received an RSTD measurement report from a PRS transmitted by each eNB. As mentioned in the foregoing description, RSTD corresponds to a difference between reception timing (e.g., time of arrival (TOA)) values measured from predetermined subframes of a reference cell and an adjacent cell. A UE converts the RSTD into a specific value of mapping table and reports the value to the network.

According to the description on the OTDOA-ReferenceCellInfo field, if prsInfo exists for a reference cell, the cpLength indicates CP length information of a reference cell PRS. Hence, the CP length information of the reference cell CRS does not exist. Similarly, according to the description on the OTDOA-NeighbourCellInfoElement field, if a PRS exists for a specific neighbor cell, the cpLength indicates CP length information of a neighbor cell PRS. Hence, the CP length information of the neighbor cell CRS does not exist.

It may be able to perform RSTD measurement for OTDOA positioning by utilizing a PRS or utilizing both a PRS and a CRS depending on implementation of a UE. If the RSTD measurement is performed by utilizing both the PRS and the CRS, since it is able to secure more resources capable of being used for measurement compared to a case of utilizing the PRS only, it may be able to increase accuracy.

Meanwhile, according to a current LTE standard, a CRS and a PRS may have a different type of CP in a specific subframe. For example, when a positioning occasion is configured in a subframe configured as an MBSFN subframe, among OFDM symbols configured as an MBSFN region in the MBSFN subframe, a CP of an OFDM symbol including a PRS may be configured as an extended CP, whereas a CP of an OFDM symbol including a CRS may be configured as a normal CP (a subframe #0 corresponds to a normal CP). In particular, although CP length information of a PRS for a specific cell is provided, because CP length information of a CRS for the cell is not provided, ambiguity may occur. In particular, if information on a CP length of a CRS is not clear, it may have a bad influence on RSTD measurement accuracy of a UE.

Similarly, if information on the number of CRS antenna ports of a specific cell and information on an MBSFN subframe configuration are not clear, it may have a bad influence on accuracy of RSTD measurement measured by a UE based on a CRS of the cell. For example, if the number of CRS antenna ports of a specific cell is precisely provided to a UE, the UE is able to accurately identify a resource to be used for measuring RSTD. As a different example, if MBSFN subframe configuration-related information on a specific cell is precisely provided, it is able to identify whether or not the specific cell corresponds to an MBSFN subframe in a specific subframe and identify that a CRS is not transmitted in an MBSFN region of the subframe. Hence, it is able to accurately identify a resource to be used for measuring RSTD and perform RSTD measurement. The present invention proposes the following.

A UE may receive or configured with all or a part of information on a specific cell described in the following from a network (e.g., a location server).

Information on the number of CRS antenna ports for a specific cell

For example, the number of CRS antenna ports for a specific cell may be explicitly provided to a UE using a value selected from the group consisting of 1, 2, and 4. As mentioned in the foregoing description, according to current LTE standard, it may indicate one of two states including "1 or 2 antenna ports" and "4 antenna ports".

MBSFN subframe configuration information on a specific cell

For example, MBSFN subframe configuration information on a specific cell may be explicitly provided to a UE in a unit of 1 or 4 radio frames.

CP length information of a CRS for a specific cell

For example, CP length information of a CRS for a specific cell may be explicitly provided to a UE using either a normal CP value or an extended CP value.

As a different example, there may exist a field for indicating CP length information of a CRS only when a CP length of a CRS is different from a CP length of a PRS for a specific cell. If the field for indicating the CP length information of the CRS does not exist, a UE considers that a CP length of a CRS and a CP length of a PRS are identical to each other.

A UE may receive the abovementioned information from a location server via an LPP (LTE positioning protocol) irrespective of information provided for cancelling CRS interference discussed earlier in feICIC (further enhanced inter-cell interference cancellation). The UE may utilizes a CRS to measure RSTD without ambiguity for a specific cell CRS using the aforementioned information.

If a UE fails to receive all or a part of "information on the number of CRS antenna ports for a specific cell", "MBSFN subframe configuration information on a specific cell", and "CP length information of a CRS for a specific cell" from a network (e.g., a location server), it may define a rule for a UE behavior in order to make the UE not utilize a CRS for RSTD measurement.

Or, if a UE fails to receive all or a part of "information on the number of CRS antenna ports for a specific cell", "MBSFN subframe configuration information on a specific cell", and "CP length information of a CRS for a specific cell" from a network (e.g., a location server), it may define a rule for a UE behavior in order to make the UE utilize a PRS only for RSTD measurement.

Or, when a UE fails to receive all or a part of "information on the number of CRS antenna ports for a specific cell", "MBSFN subframe configuration information on a specific cell", and "CP length information of a CRS for a specific cell" from a network (e.g., a location server), if the UE uses a CRS to measure RSTD, it may define a rule for a UE behavior in order to make the UE utilize an antenna port 0 only.

Or, when a UE fails to receive all or a part of "information on the number of CRS antenna ports for a specific cell", "MBSFN subframe configuration information on a specific cell", and "CP length information of a CRS for a specific cell" from a network (e.g., a location server), it may define a rule for a UE behavior in order to make the UE utilize a CRS only among specific OFDM symbol(s) (e.g., all or a part of OFDM symbols of index=0, 1, 4, 7, 8, and 11) while a CRS is used for measuring RSTD.

It may define a rule of using a different RS to measure RSTD. Or, a third party RS may be newly defined and a UE may receive an RS-related configuration for a specific cell from a network (e.g., location server). For example, the RS-related configuration may be configured via an LPP (LTE positioning protocol) or a specific higher layer signal.

According to LTE standard, a location server (e.g., E-SMLC) may provide assistant data for measuring RSTD to a UE to support OTDOA positioning. In this case, information on a reference cell and information on a target cell (neighbor cell) are loaded on "OTDOA-ReferenceCellInfo" and "OTDOA-NeighbourCellInfoElement", respectively. The UE performs PRS timing measurement using the information and reports a final RSTD measurement value to the location server. Yet, similar to CoMP scenario 4, if the same physical cell ID is assigned to a plurality of TPs/RRHs (remote radio heads) belonging to a specific cell, since a PRS/CRS is transmitted in a manner that a single physical cell ID corresponding to a plurality of the TPs/RRHs is generated and the cell ID is mapped to the same RE, the UE is unable to identify a TP/RRH from which the PRS/CRS is transmitted.

Hence, when assistant data for measuring RSTD is set to the UE, if "physCellId" field belonging to the assistant data for two specific cells indicates the same value, a behavior of the UE may be defined as follows.

If "OTDOA-ReferenceCellInfo" and "physCellId" field belonging to "OTDOA-NeighbourCellInfoElement" for a specific cell (one or a plurality of cells) indicate the same value, it may predefine a rule that the UE measures a PRS only corresponding to a reference cell and measurement on a neighbor cell(s) is not performed. In this case, the UE does not report RSTD measurement measured on the neighbor cell(s).

it may predefine a rule that the UE measures a PRS only corresponding to a reference cell and PRS measurement is performed on a neighbor cell(s) only or CRS measurement is not performed on the neighboring cell(s).

it may predefine a rule that the UE measures a PRS corresponding to a reference cell and/or a CRS and measurement is not performed on a neighbor cell(s). In this case, the UE does not report RSTD measurement measured on the neighbor cell(s).

it may predefine a rule that the UE measures a PRS corresponding to a reference cell and/or a CRS and PRS measurement is performed on a neighbor cell(s) only or CRS measurement is not performed on the neighboring cell(s).

If "physCellId" field belonging to "OTDOA-NeighbourCellInfoElement" for a plurality of specific cells indicates the same value, it may predefine a rule that the UE performs PRS measurement on a first (or a predefined/predetermined) cell belonging to "OTDOA-NeighbourFreqInfo" only and measurement on the remaining cells is not performed. In this case, the UE does not report RSTD measurement measured on the remaining cells.

it may predefine a rule that the UE performs PRS measurement on a first (or a predefined/predetermined) cell belonging to "OTDOA-NeighbourFreqInfo" only and PRS measurement is performed on the remaining cells only or CRS measurement is not performed on the remaining cells.

it may predefine a rule that the UE performs PRS measurement and/or CRS measurement on a first (or a predefined/predetermined) cell belonging to "OTDOA-NeighbourFreqInfo" only and measurement on the remaining cells is not performed. In this case, the UE does not report RSTD measurement measured on the remaining cells.

it may predefine a rule that the UE performs PRS measurement and/or CRS measurement on a first (or a predefined/predetermined) cell belonging to "OTDOA-NeighbourFreqInfo" and PRS measurement is performed on the remaining cells only or CRS measurement is not performed on the remaining cells.

It may predefine a rule that the abovementioned rules are applied when "OTDOA-NeighbourCellInfoElement" for a plurality of cells is included in the same OTDOA-NeighbourFreqInfo only (or, irrespective of the OTDOA-NeighbourFreqInfo).

In order to more accurately estimate a channel property of a PRS signal transmitted from an eNB or a TP, it may be able to additionally notify information on an RS including reception property identical to reception property of the PRS. The information may be referred to as QCL (quasi-co-location) information of channel property. It may be able to finally determine the channel property of the PRS by utilizing a channel property of a signal in a QCL relation and a measurement value for the channel property of the PRS at the same time.

If a UE fails to receive "QCL information between a PRS for a specific cell and a specific RS" from a network (e.g., a location server), it may be able to define a rule for a UE behavior that the UE utilizes a PRS only to measure RSTD or the UE does not use the specific RS (e.g., CRS, CSI-RS, etc.).

The "QCL information between a PRS for a specific cell and a specific RS" may indicate that the PRS and a (predefined/predetermined) specific antenna port of the specific RS is in QCL relation only. Having received the information from the network, the UE may use the specific antenna port only of the RS to measure RSTD.

Since it is able to include the examples for the proposed method as one of implementation methods of the present invention, it is apparent that the examples are considered as a sort of proposed methods. Although the embodiments of the present invention may be independently implemented, the embodiments may also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

Figure 8:
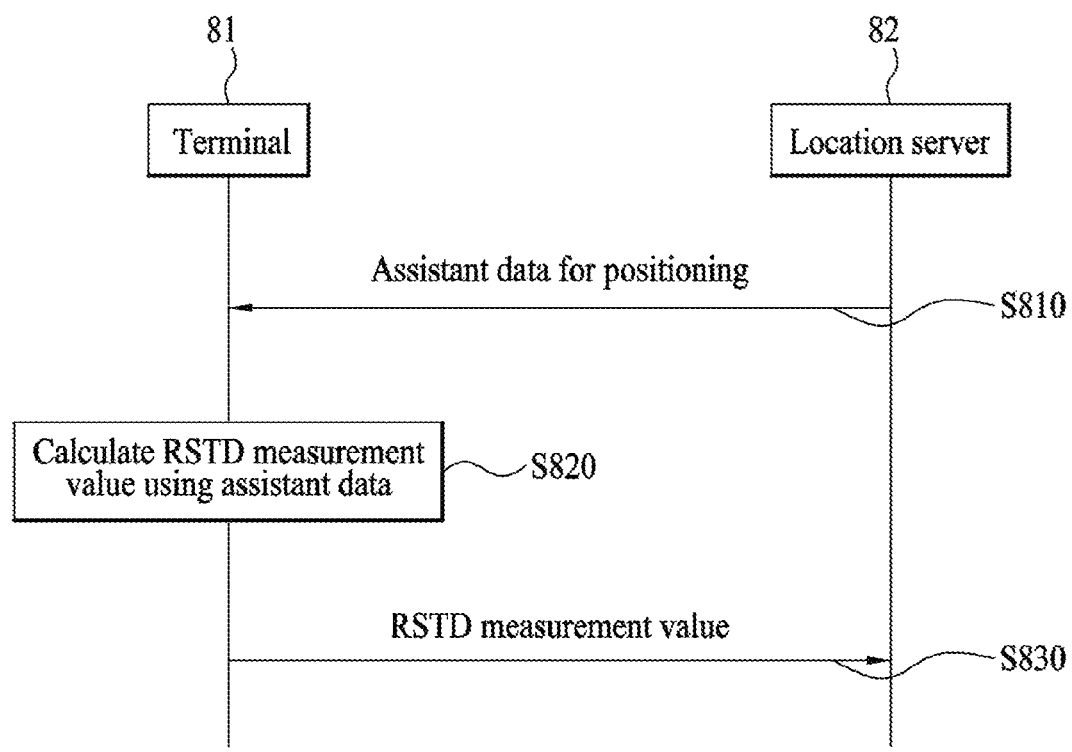
FIG. 8 is a diagram illustrating an operation according to one embodiment of the present invention.

FIG. 8 is a diagram illustrating an operation according to one embodiment of the present invention.

FIG. 8 shows an operation of measuring a reference signal for determining a location in a wireless communication system. The operation is performed by a terminal 81.

The terminal may receive assistant data related to a reference cell and one or more neighbor cells for positioning [S810]. The terminal may receive a positioning reference signal (PRS) or a cell-specific reference signal (CRS) of the reference cell and the one or more neighbor cells and calculate a reference signal time difference (RSTD) measurement value [S820]. The terminal may report the measurement value to a location server [S830].

The assistant data may include information on the number of CRS antenna ports, CRS cyclic prefix (CP) length information, or configuration information on multicast broadcast single frequency network (MBSFN) subframes of the reference cell and the one or more neighbor cells.

And, the information on the number of CRS antenna ports may indicate one selected from the group consisting of 1, 2 and 4.

And, the CRS CP length information may exist only when the PRS of the reference cell is different from a CP length of the CRS of the reference cell or when the PRS of the one or more neighbor cells is different from the CP length of CRS of the one or more neighbor cells. when the CRS CP length information is not included in the assistant data, the PRS of the reference cell is identical to the CP length of the CRS of the reference cell or the PRS of the one or more neighbor cells is identical to the CP length of the CRS of the one or more neighbor cells.

And, the configuration information on the MBSFN subframes may be provided in a unit of 1 or 4 radio frames.

When the assistant data related to a specific cell of the one or more neighbor cells does not include all or a part of the information on the number of CRS antenna ports, the CRS CP length information, and the configuration information on the MBSFN subframes, a CRS may be used for the RSTD measurement for the specific cell.

When the assistant data related to a specific cell of the one or more neighbor cells does not include all or a part of the information on the number of CRS antenna ports, the CRS CP length information, and the configuration information on the MBSFN subframes, the terminal may calculate the RSTD measurement value by receiving a CRS only transmitted via a CRS port 0 of the specific cell.

When the assistant data related to a specific cell of the one or more neighbor cells does not include all or a part of the information on the number of CRS antenna ports, the CRS CP length information, and the configuration information on the MBSFN subframes, the terminal may calculate the RSTD measurement value by receiving a CRS transmitted via a specific OFDM symbol only, which transmitted from the specific cell.

When the assistant data related to a specific cell of the one or more neighbor cells does not include all or a part of the information on the number of CRS antenna ports, the CRS CP length information, and the configuration information on the MBSFN subframes, the terminal may calculate the RSTD measurement value by receiving a PRS only, which transmitted from the specific cell.

When a physical layer cell identifier (ID) field of the reference cell is identical to a physical cell ID of at least one neighbor cell among the one or more neighbor cells, only a PRS of the reference cell may be used for measuring RSTD and RSTD measurement may be not performed for the at least one neighbor cell.

When a physical layer cell identifier (ID) field of the reference cell is identical to a physical cell ID of at least one neighbor cell among the one or more neighbor cells, only a PRS of the reference cell may be used for measuring RSTD and only a PRS of the at least one neighbor cell may be used for measuring RSTD.

When a physical layer cell identifier (ID) field of the reference cell is identical to a physical cell ID of at least one neighbor cell among the one or more neighbor cells, a PRS and/or a CRS of the reference cell may be used for measuring RSTD and RSTD measurement may not be performed for the at least one neighbor cell.

When a physical layer cell identifier (ID) field of the reference cell is identical to a physical cell ID of at least one neighbor cell among the one or more neighbor cells, a PRS and/or a CRS of the reference cell may be used for measuring RSTD and only a PRS of the at least one neighbor cell may be used for measuring RSTD.

When physical layer cell identifiers (IDs) of a plurality of neighbor cells included in the assistant data are identical to each other, only a PRS of a predetermined neighbor cell among a plurality of the neighbor cells may be used for measuring RSTD and RSTD measurement may not be performed for the remaining neighbor cells other than the predetermined neighbor cell.

If physical layer cell identifiers (IDs) of a plurality of neighbor cells included in the assistant data are identical to each other, only a PRS of a predetermined neighbor cell among a plurality of the neighbor cells is used for measuring RSTD and only PRS of the remaining neighbor cells other than the predetermined neighbor cell may be used for measuring RSTD.

If physical layer cell identifiers (IDs) of a plurality of neighbor cells included in the assistant data are identical to each other, a PRS and/or a CRS of a predetermined neighbor cell among the plurality of the neighbor cells may be used for measuring RSTD and RSTD measurement may not be performed for the remaining neighbor cells other than the predetermined neighbor cell.

If physical layer cell identifiers (IDs) of a plurality of neighbor cells included in the assistant data are identical to each other, a PRS and/or a CRS of a predetermined neighbor cell among the plurality of the neighbor cells is used for measuring RSTD and only PRS of the remaining neighbor cells other than the predetermined neighbor cell may be used for measuring RSTD.

The terminal may receive information on a specific reference signal (RS), which is in a quasi-co-location (QCL) relation with a PRS of the reference cell or the one or more neighbor cells. The information on the specific RS may be used for determining a channel property of the PRS, which is in the QCL relation with the RS.

The information on the specific RS may include information on a specific antenna port of the RS, which is in the QCL relation with the PRS.

In the foregoing description, embodiments of the present invention have been briefly explained with reference to FIG. 8. An embodiment related to FIG. 8 can alternatively or additionally include at least a part of the aforementioned embodiments.

Figure 9:
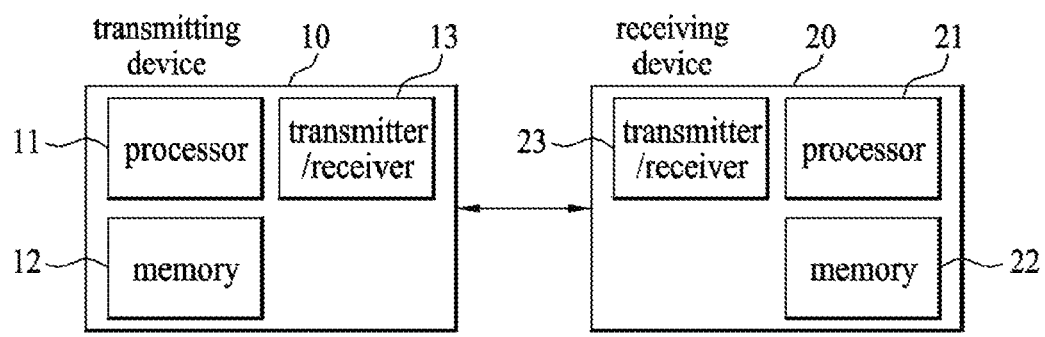
FIG. 9 is a block diagram of a device for implementing embodiment(s) of the present invention.

FIG. 9 is a block diagram illustrating a transmitting device 10 and a receiving device 20 configured to implement embodiments of the present invention. Each of the transmitting device 10 and receiving device 20 includes transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitting device 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE operates as the transmitting device 10 on uplink, and operates as the receiving device 20 on downlink. In embodiments of the present invention, the eNB operates as the receiving device 20 on uplink, and operates as the transmitting device 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

The present invention is applicable to wireless communication devices such as a terminal, a relay, and a base station.

What is claimed is:

1. A method of reporting information for positioning by a user equipment (UE) in a wireless communication system, the method comprising:
   receiving, from a location server, assistant data related to a plurality of cells including a reference cell and one or more neighbor cells;
   receiving, from the location server, quasi-co-location (QCL) information between a positioning reference signal (PRS) of the plurality of cells and a cell-specific reference signal (CRS) of the plurality of cells;
   calculating a reference signal time difference (RSTD) measurement value using both the PRS of the plurality of cells and the CRS of the plurality of cells based on the assistant data and the QCL information; and
   reporting the RSTD measurement value to the location server,
   wherein the assistant data includes information on a cyclic prefix (CP) length of the PRS of the plurality of cells, a CP length of the CRS of the plurality of cells, and a multicast broadcast single frequency network (MBSFN) subframe configuration of the plurality of cells.

2. The method of claim 1, wherein the QCL information informs an antenna port of the CRS in QCL relation with an antenna port of the PRS.

3. The method of claim 1, wherein the QCL information is received based on the assistant data.

4. The method of claim 1, wherein the assistant data further includes information on a number of antenna ports of the CRS selected from groups consisting of 1, 2, and 4.

5. The method of claim 1, wherein the CP length of the PRS of the reference cell is different from the CP length of the CRS of the reference cell or the CP length of the PRS of the one or more neighbor cells is different from the CP length of the CRS of the one or more neighbor cells.

6. The method of claim 1, wherein the MBSFN subframe configuration relates with subframes included in 1 or 4 radio frames.

7. The method of claim 1, wherein when a physical layer cell identifier (ID) field of the reference cell is identical to a physical cell ID of at least one neighbor cell among the one or more neighbor cells, RSTD measurement is not performed for the at least one neighbor cell.

8. A user equipment (U) reporting information for positioning in a wireless communication system, the UE comprising:
   a transceiver; and
   a processor coupled with the transceiver, the processor configured to:
   receive, from a location server, assistant data related to a plurality of cells including a reference cell and one or more neighbor cells;

receive, from the location server, quasi-co-location (QCL) information between a positioning reference signal (PRS) of the plurality of cells and a cell-specific reference signal (CRS) of the plurality of cells;

calculate a reference signal time difference (RSTD) measurement value using both the PRS of the plurality of cells and the CRS of the plurality of cells based on the assistant data and the QCL information; and report the RSTD measurement value to the location server, wherein the assistant data includes information on a cyclic prefix (CP) length of the PRS of the plurality of cells, a CP length of the CRS of the plurality of cells, and a multicast broadcast single frequency network (MBSFN) subframe configuration of the plurality of cells.

* * * * *